United States Patent
Woo et al.

(10) Patent No.: US 8,950,204 B2
(45) Date of Patent: Feb. 10, 2015

(54) HEAT PUMP INTEROPERATING HOT WATER FEEDING APPARATUS

(75) Inventors: Hyoungsuk Woo, Changwon-si (KR); Donghyuk Lee, Changwon-si (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 13/339,760

(22) Filed: Dec. 29, 2011

(65) Prior Publication Data

US 2012/0192582 A1 Aug. 2, 2012

(30) Foreign Application Priority Data

Dec. 30, 2010 (KR) .................. 10-2010-0139325

(51) Int. Cl.
| | |
|---|---|
| *F25B 7/00* | (2006.01) |
| *F25B 30/02* | (2006.01) |
| *F24D 3/18* | (2006.01) |
| *F24D 19/10* | (2006.01) |
| *F25B 6/04* | (2006.01) |

(52) U.S. Cl.
CPC .............. *F24D 3/18* (2013.01); *F24D 19/1039* (2013.01); *F25B 6/04* (2013.01); *F25B 7/00* (2013.01); *F25B 30/02* (2013.01); *F25B 2339/047* (2013.01)
USPC ............................................. 62/160; 62/175

(58) Field of Classification Search
CPC ............ F25B 7/00; F25B 13/00; F25B 30/00; F25B 30/02; F25B 2700/2104; F25B 2700/2106
USPC ............................... 62/160, 175, 238.6, 238.7
See application file for complete search history.

(56) References Cited

U.S. PATENT DOCUMENTS

| | | | | |
|---|---|---|---|---|
| 4,391,104 | A | * | 7/1983 | Wendschlag ....................... 62/79 |
| 7,640,763 | B2 | * | 1/2010 | Nishimura et al. ........... 62/238.6 |
| 2010/0050675 | A1 | * | 3/2010 | Kameyama et al. ......... 62/238.7 |
| 2011/0289952 | A1 | * | 12/2011 | Kim et al. ....................... 62/189 |
| 2012/0312045 | A1 | * | 12/2012 | Kim ............................ 62/238.6 |

FOREIGN PATENT DOCUMENTS

| | | |
|---|---|---|
| CN | 101464056 A | 6/2009 |
| CN | 101871690 A | 10/2010 |
| JP | 62-52376 A | 3/1987 |
| JP | 01-212862 A | 8/1989 |
| JP | 04-254156 A | 9/1992 |
| JP | 06-052139 B2 | 7/1994 |

OTHER PUBLICATIONS

Korean Office Action dated Aug. 23, 2012 issued in Application No. 10-2010-0139325.
Chinese Office Action dated Nov. 6, 2013 issued in Application No. 201110461316.7.
Korean Notice of Allowance dated Dec. 3, 2012 issued in Application No. 10-2012-0139325.

* cited by examiner

*Primary Examiner* — Marc Norman
(74) *Attorney, Agent, or Firm* — Ked & Associates, LLP

(57) ABSTRACT

A heat pump interoperating hot water feeding apparatus is provided that may determine whether to activate only the first coolant circulation circuit along which the first coolant is circulated or the first coolant circulation circuit as well as the second coolant circulation circuit along which the second coolant is circulated depending on an external air temperature or target water temperature, thus providing the optimal performance.

9 Claims, 6 Drawing Sheets

– – Prior Art – –

HEAT PUMP INTEROPERATING HOT WATER FEEDING APPARATUS

CROSS-REFERENCE TO RELATED APPLICATION

This application claims priority to Korean Patent Application No. 10-2010-0139325 filed on Dec. 30, 2010, the contents of which are herein incorporated by reference in its entirety.

BACKGROUND OF THE INVENTION

1. Field of the invention

The embodiments of the present invention are directed to a heat pump interoperating hot water feeding apparatus, and more specifically to a heat pump interoperating hot water feeding apparatus that may control the operation of first and second compressors to exhibit the optimal performance by, for each mode, determining whether to activate only a first coolant circulation circuit along which a first coolant is circulated or the first coolant circulation circuit as well as a second coolant circulation circuit along which a second coolant is circulated depending on an external air temperature or target water temperature when the first and second coolants are circulated by first and second compressors, respectively.

2. Description of the Related Art

Generally, heat pumps compress, condense, expand, and evaporate a coolant to heat or cool an indoor space.

Heat pumps may be classified into regular air conditioners each having an indoor unit and an outdoor unit connected to the indoor unit and multi air conditioners each having a plurality of indoor units and an outdoor unit connected to the plurality of indoor units. A heat pump includes a hot water feeding unit for supplying hot water and a room heating unit for heating a room by hot water.

FIG. 1 is a pneumatic circuit diagram illustrating a heat pump interoperation hot water feeding apparatus according to the prior art, wherein the heat pump interoperation hot water feeding apparatus heats water using a dual-source coolant cycle.

Referring to FIG. 1, the conventional heat pump interoperation hot water feeding apparatus includes a first compressor 5 for compressing a first coolant during a room heating mode operation, a first heat exchanger 10 for condensing the first coolant compressed by the first compressor 5, a first expander 15 for expanding the first coolant condensed by the first heat exchanger 10, and a second heat exchanger 20 for evaporating the first coolant expanded by the first expander 15. A flow of the first coolant by the first compressor 5 is referred to as a first coolant circulation unit I.

To implement a dual-source cooling cycle, the conventional heat pump interoperation hot water feeding apparatus includes a second compressor 25 for compressing a second coolant during a room heating mode operation, a third heat exchanger 30 for condensing the second coolant compressed by the second compressor 25, a second expander 35 for expanding the second coolant condensed by the third heat exchanger 30, and a fourth heat exchanger 10 for evaporating the second coolant expanded by the second expander 35. A flow of the second coolant by the second compressor 35 is referred to as a second coolant circulation unit II.

The first heat exchanger 10 and the fourth heat exchanger 10 have the same configuration. During a room heating mode operation, the first cool of the first coolant circulation unit I is condensed and the second coolant of the second coolant circulation unit II is evaporated by the first or fourth heat exchanger 10. As such, a cycle of performing heat exchange on the first and second coolants having different characteristics (or specifications) in a manner of crossing each other to obtain higher performance is called a dual-source cooling cycle, which is well known.

The conventional heat pump interoperation hot water feeding apparatus obtains evaporation latent heat of the second heat exchanger in the first coolant circulation unit by performing heat exchange with external air and obtains condensation latent heat of the third heat exchanger in the second coolant circulation unit from used water that conducts heat exchange with the second coolant while passing through the third heat exchanger.

The conventional heat pump interoperation hot water feeding apparatus has an advantage of being able to obtain a higher-temperature of used water by using a principle of the dual-source cooling cycle. However, the conventional heat pump interoperation hot water feeding apparatus can obtain only the high-temperature used water that is generated after the first and second compressors are operated rather than used water having a temperature desired by a user. Further, the conventional heat pump interoperation hot water feeding apparatus operates the second compressor even when the external air temperature is high or a target water temperature desired by the user is low, thus deteriorating the overall performance of the heat pump interoperation hot water feeding apparatus.

SUMMARY OF THE INVENTION

Embodiments of the present invention provide a heat pump interoperating hot water feeding apparatus that may control the operation of first and second compressors to exhibit the optimal performance by, for each mode, determining whether to activate only a first coolant circulation circuit along which a first coolant is circulated or the first coolant circulation circuit as well as a second coolant circulation circuit along which a second coolant is circulated depending on an external air temperature or target water temperature.

According to an embodiment of the present invention, there is provided a heat pump interoperation hot water feeding apparatus comprising a first coolant circulation circuit that circulates a first coolant by a first compressor that compresses the first coolant, a second coolant circulation circuit that circulates a second coolant by a second compressor that compresses the second coolant, and a used water circulation circuit that discharges used water that is heat exchanged with one of the first coolant and the second coolant, wherein it is determined depending on one of an external air temperature, a target water temperature of the used water, and an indoor temperature whether to operate the first coolant circulation circuit alone or both the first and second coolant circulation circuits.

The heat pump interoperation hot water feeding apparatus further comprises a cascade heat exchanger, wherein the first and second coolant circulation circuits partially cross each other so that during a room heating operation, the first coolant is primarily condensed by the used water circulation circuit and then heat exchanged with the second coolant to be secondarily condensed, and the second coolant is heat exchanged with the first coolant to be evaporated.

The heat pump interoperation hot water feeding apparatus further comprises a first heat exchanger arranged over the first coolant circulation circuit, wherein the first heat exchanger primarily condenses the first coolant by allowing the first coolant to be heat exchanged with the used water flowing through the used water circulation circuit during a room heating operation, and a second heat exchanger arranged over the second coolant circulation circuit, wherein the second heat exchanger primarily condenses the second coolant by allowing the second coolant to be heat exchanged with the used water flowing through the used water circulation circuit during a room heating operation, wherein the used water circulation circuit allows the used water to be heat exchanged with both or either of the first coolant and/or the second coolant through both or either of the first heat exchanger and/or the second heat exchanger depending on the target water temperature of the used water.

The target water temperature of the used water includes a first preset water temperature range and a second preset water temperature range, wherein assuming that the first preset water temperature range is lower than the second preset water temperature range, when the target water temperature of the used water is within the first preset water temperature range, only the first coolant circulation circuit of the first and second coolant circulation circuits is operated so that the used water is heat exchanged with only the first coolant of the first heat exchanger.

The target water temperature of the used water includes a first preset water temperature range and a second preset water temperature range, wherein assuming that the first preset water temperature range is lower than the second preset water temperature range, when the target water temperature of the used water is within the second preset water temperature range, only the second coolant circulation circuit of the first and second coolant circulation circuits is operated so that the used water is heat exchanged with only the second coolant of the second heat exchanger, or both the first and second coolant circulation circuits are operated so that the used water is heat exchanged with the first coolant of the first heat exchanger and is then heat exchanged with the second coolant of the second heat exchanger.

The target water temperature of the used water includes a first preset water temperature range and a second preset water temperature range, wherein assuming that the first preset water temperature range is higher than the second preset water temperature range, when the target water temperature of the used water is within the first preset water temperature range, only the first coolant circulation circuit of the first and second coolant circulation circuits is operated so that the used water is heat exchanged with only the first coolant of the first heat exchanger.

The target water temperature of the used water includes a first preset water temperature range and a second preset water temperature range, wherein assuming that the first preset water temperature range is higher than the second preset water temperature range, when the target water temperature of the used water is within the second preset water temperature range, only the second coolant circulation circuit of the first and second coolant circulation circuits is operated so that the used water is heat exchanged with only the second coolant of the second heat exchanger, or both the first and second coolant circulation circuits are operated so that the used water is heat exchanged with the first coolant of the first heat exchanger and is then heat exchanged with the second coolant of the second heat exchanger.

The heat pump interoperation hot water feeding apparatus further comprises a first compressor that compresses and circulates the first coolant, and a second compressor that compresses and circulates the second coolant, wherein the first preset external air temperature range or the first preset water temperature range is set so that the first compressor exhibits higher operational performance when the first and second compressors are operated at the same water temperature and the same external air temperature.

Only the first compressor is operated so that only the first coolant circulation circuit of the first and second coolant circulation circuits is operated during a room cooling operation or during a defrost operation.

The used water circulation circuit includes a first used water circuit configured so that the used water passes through the first heat exchanger, a second used water circuit configured so that the used water passes through the second heat exchanger, and a valve that opens and closes a flow of the used water in the first and second used water circuits.

During a room heating mode operation, the valve opens the first used water circuit when the first coolant circulation circuit operates on and opens only the second used water circuit and both the first and second used water circuits when the second coolant circulation circuit operates on.

According to the embodiments of the present invention, the heat pump interoperating hot water feeding apparatus may determine whether to activate only the first coolant circulation circuit along which the first coolant is circulated or the first coolant circulation circuit as well as the second coolant circulation circuit along which the second coolant is circulated depending on an external air temperature or target water temperature, thus providing the optimal performance.

BRIEF DESCRIPTION OF THE DRAWINGS

The embodiments of the present invention will become readily apparent by reference to the following detailed description when considered in conjunction with the accompanying drawings wherein.

DETAILED DESCRIPTION

Hereinafter, embodiments of the present invention will be described with reference to the accompanying drawings.

Figure 1:
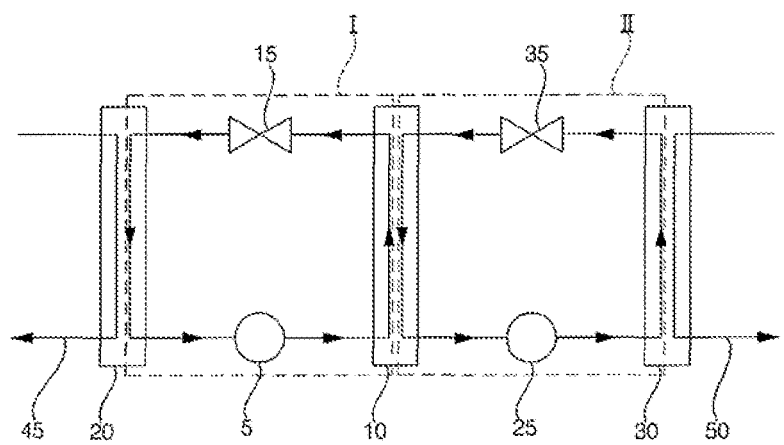
FIG. 1 is a pneumatic circuit diagram illustrating a heat pump interoperation hot water feeding apparatus according to the prior art, wherein the heat pump interoperation hot water feeding apparatus heats water using a dual-source coolant cycle.
Figure 2:
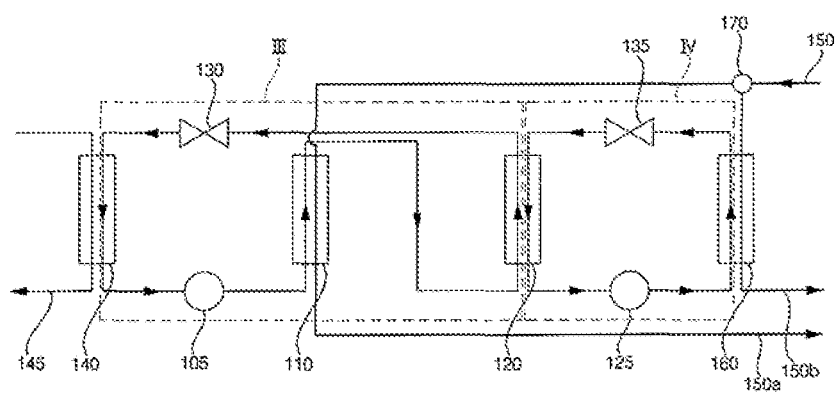
FIG. 2 is a pneumatic circuit diagram illustrating a heat pump interoperating hot water feeding apparatus according to an embodiment of the present invention, wherein hot water feeding is performed using a dual-source coolant cycle.

FIG. 2 is a pneumatic circuit diagram illustrating a heat pump interoperating hot water feeding apparatus according to an embodiment of the present invention, wherein hot water feeding is performed using a dual-source coolant cycle.

Referring to FIG. 2, the heat pump interoperating hot water feeding apparatus includes a first compressor 105 for compressing a first coolant during a room heating mode operation, a first heat exchanger 110 for condensing the first coolant compressed by the first compressor 105, a first expander 130 for expanding the first coolant by the first heat exchanger 110, and a second heat exchanger 140 for evaporating the first coolant expanded by the first expander 130.

Hereinafter, the flow of the first coolant through the first heat exchanger 110, the first expander 130, and the second heat exchanger 140 by the first compressor 105 is referred to as a first coolant circulation circuit III.

The heat pump interoperating hot water feeding apparatus also includes a second compressor 125 for compressing a second coolant during a room heating mode operation, a third heat exchanger 160 for condensing the second coolant compressed by the second compressor 125, a second expander 135 for expanding the second coolant by the third heat exchanger 160, and a fourth heat exchanger 120 for evaporating the second coolant expanded by the second expander 135.

Hereinafter, the flow of the second coolant through the third heat exchanger 160, the second expander 135, and the fourth heat exchanger 120 by the second compressor 125 is referred to as a second coolant circulation circuit III.

The first and second coolants have difference characteristics (or different specifications). For example, the first coolant may be R-410A, and the second coolant may be R-134a that performs evaporation/condensation operations at a higher temperature/pressure than R-410A.

As such, a cycle of generating a higher condensation heat or a lower evaporation heat by mutually heat exchanging the coolants having different characteristics thereby raising the overall efficiency of the system is referred to as a dual-source coolant cooling cycle or a cascade cycle.

The heat pump interoperating hot water feeding apparatus is configured so that the first coolant condensed by the first heat exchanger 105 of the first coolant circulation circuit III is cross-circulated with the second coolant by the fourth heat exchanger 120 of the second coolant circulation circuit IV. Accordingly, the first coolant is re-condensed and the second coolant is evaporated, thus providing the same effect as the cascade cycle.

Hereinafter, for ease of description, a heat exchanger that acts as an axis of the cascade cycle such as the fourth heat exchanger 120 of the second coolant circulation circuit IV is referred to as a cascade heat exchanger 120. The first coolant circulation circuit III and the second coolant circulation circuit IV jointly include the cascade heat exchanger 120 that performs heat exchange between the first and second coolants so that the first and second coolants are condensed or evaporated.

The heat pump interoperating hot water feeding apparatus further includes water circulation circuits 150, 150a, and 150b that heat exchanges water with one of the first and second coolants respectively condensed in the first and second coolant circulation circuits and discharges the water.

In the heat pump interoperating hot water feeding apparatus, whether to operate the first compressor 105 or the second compressor 125 is controlled depending on a temperature of external air or a target temperature of the used water.

According to an embodiment, the first coolant compressed by the first compressor 105 is condensed and evaporated in a relatively lower temperature range and lower pressure range than the second coolant. According to an embodiment, the second coolant compressed by the second compressor 125 is condensed and evaporated in a relatively higher temperature range and higher pressure range than the first coolant.

In such a configuration, the first coolant is primarily condensed by the first heat exchanger 110, and then re-condensed while passing through the cascade heat exchanger 120 to produce necessary evaporation latent heat while the second coolant is evaporated. The second coolant is expanded by the second expander 135 and then evaporated while passing through the cascade heat exchanger 120 to produce necessary condensation heat while the first coolant is re-condensed.

As shown in FIG. 2, the used water circulation circuit 150 is configured to pass through the first heat exchanger 110 so that hot water may be produced using the condensation heat generated while the first coolant of the first heat exchanger 110 is condensed and to pass through the third heat exchanger 160 so that hot water may be produced using the condensation heat generated while the second coolant is condensed.

For convenience of description, in terms of the used water circulation circuit 150, the first heat exchanger 110 may also be referred to as a "first usage heat exchanger 110" since the first heat exchanger 110 heats water at a low target water temperature, and the third heat exchanger 160 may also be referred to as a "second usage heat exchanger 160" since the third heat exchanger 160 heats water at a high target water temperature.

As such, various operation modes for the heat pump interoperating hot water feeding apparatus may be provided using the principle of heating water at the low target water temperature using the first usage heat exchanger 110 and the second usage heat exchanger 160 or the principle of heating water at the high target water temperature using the first usage heat exchanger 110 and the second usage heat exchanger 160.

Although it has been described in connection with FIG. 2 that during the room heating mode operation of the heat pump interoperating hot water feeding apparatus, the first coolant circulation circuit III and the second coolant circulation circuit IV are both operated for the normal room heating mode operation, various other operation modes may also be provided depending on the temperature of external air or target temperature of used water.

Specifically, the temperature range of external air may be separated into a range requiring a room cooling mode operation of the heat pump interoperating hot water feeding apparatus, a range requiring a room heating mode operation of the heat pump interoperating hot water feeding apparatus, and a range requiring a defrost mode operation of the heat pump interoperating hot water feeding apparatus. When the external air is within the preset temperature corresponding to each operation mode range, the corresponding operation mode may be performed.

Since the heat pump interoperating hot water feeding apparatus uses the cascade cycle, the range requiring the room heating mode operation may be divided into a first preset external air temperature range (refer to "A" of FIG. 7) in which only the first compressor 105 operates to activate only the first coolant circulation circuit III and a second preset external air temperature range (refer to "B" of FIG. 7) which is relatively lower than the first preset external air temperature range, wherein the second compressor 125 operates together with the first compressor 105 to activate both the first coolant circulation circuit III and the second coolant circulation circuit IV.

Figure 3:
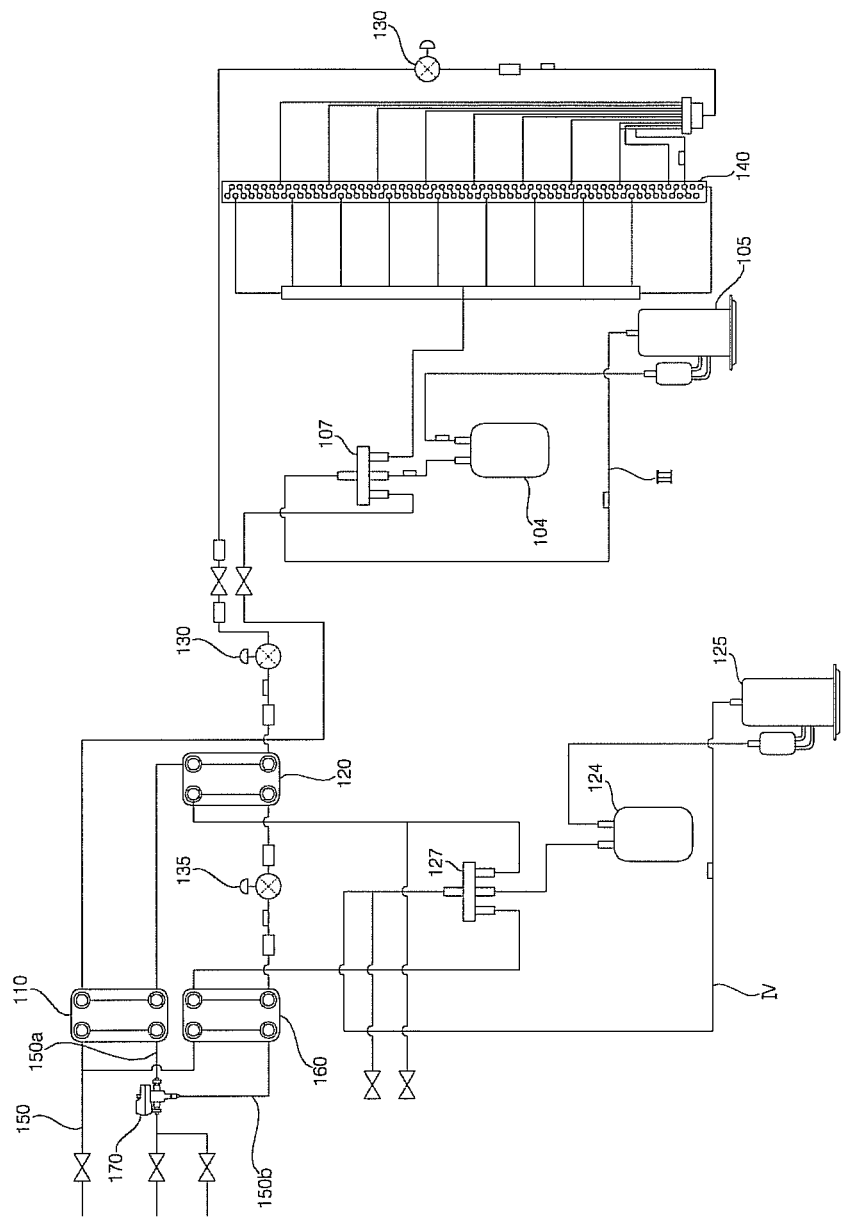
FIG. 3 is a pneumatic circuit diagram illustrating a heat pump interoperating hot water feeding apparatus according to an embodiment of the present invention.
Figure 4:
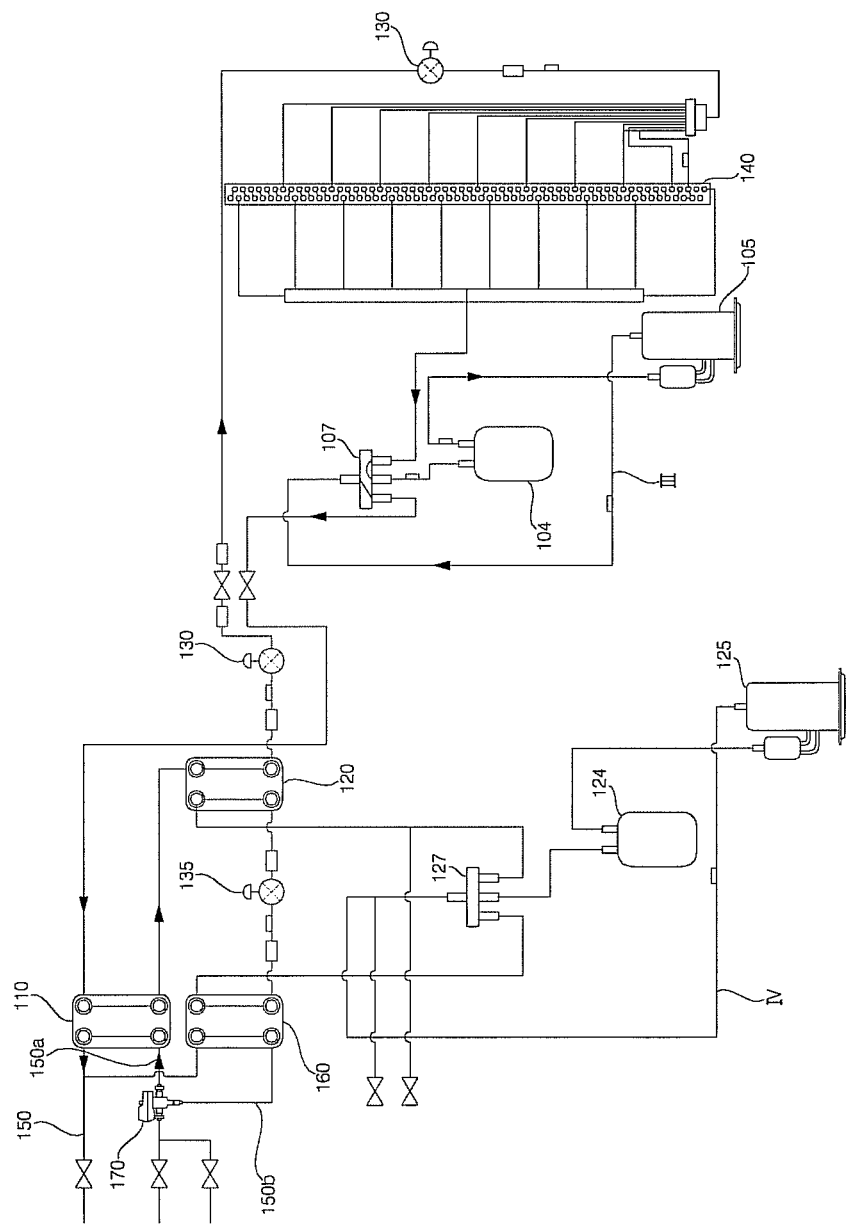
FIG. 4 illustrates a flow of a coolant when the temperature of external air is high and target water temperature of used water is low during the room heating mode operation of FIG. 3.
Figure 5:
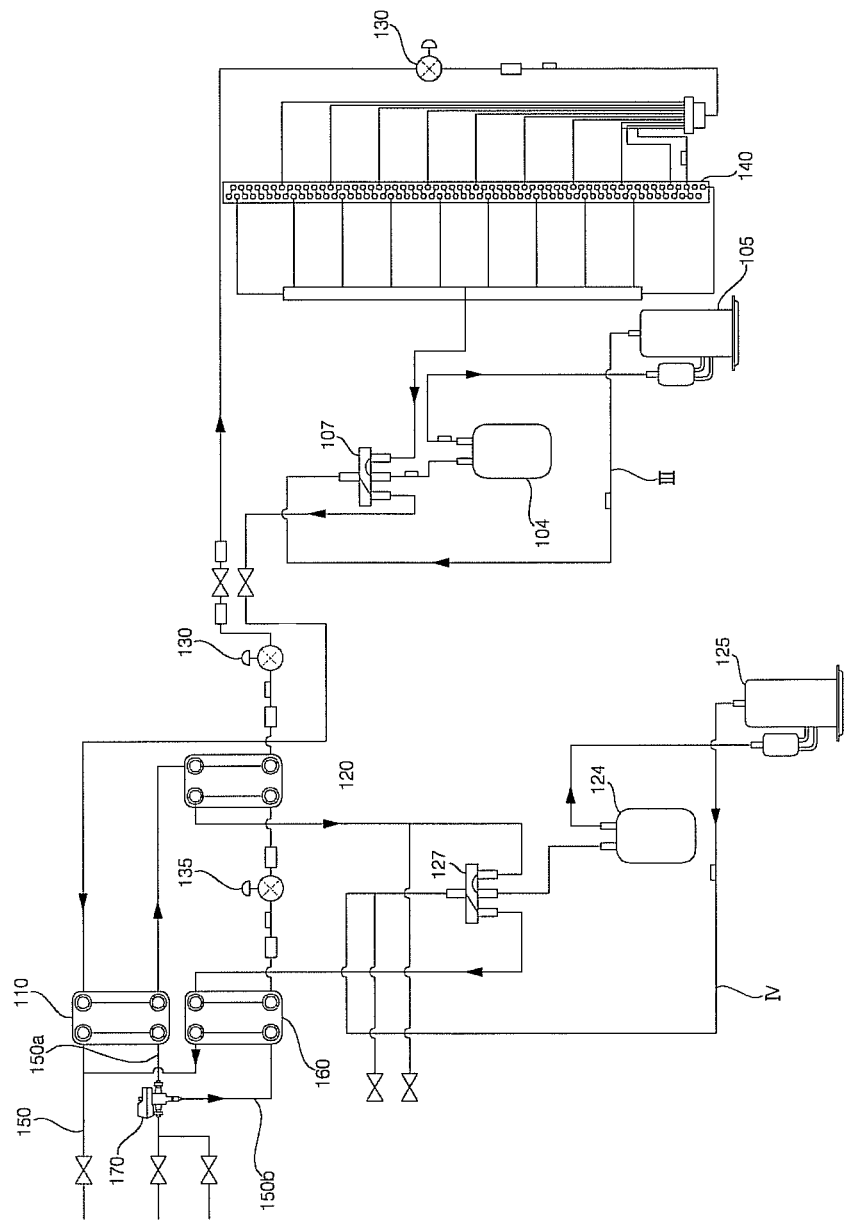
FIG. 5 illustrates a flow of a coolant when the temperature of external air is low and target water temperature of used water is high during the room heating mode operation of FIG. 3.
Figure 6:
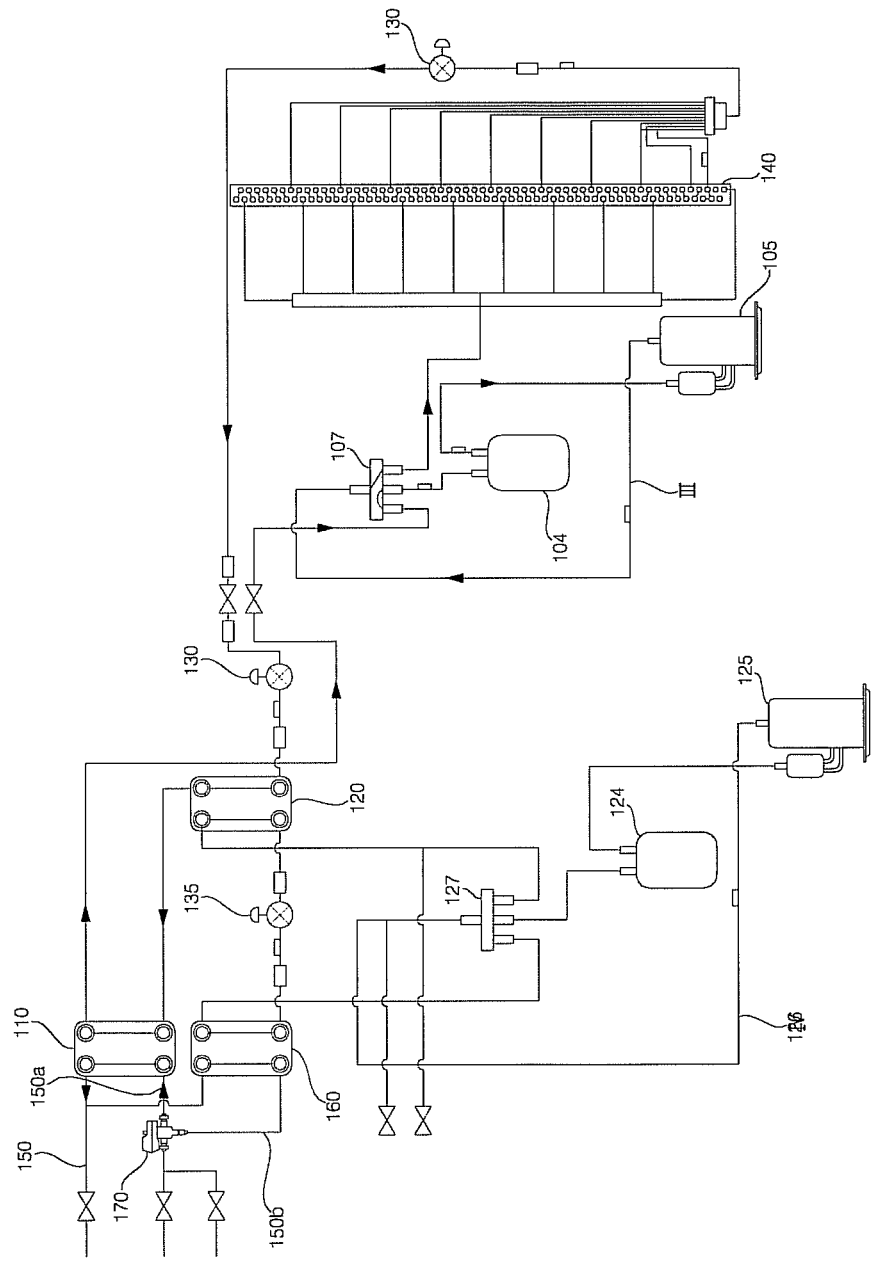
FIG. 6 illustrates a flow of a coolant during the room cooling mode operation and defrost mode operation of FIG. 3.
Figure 7:
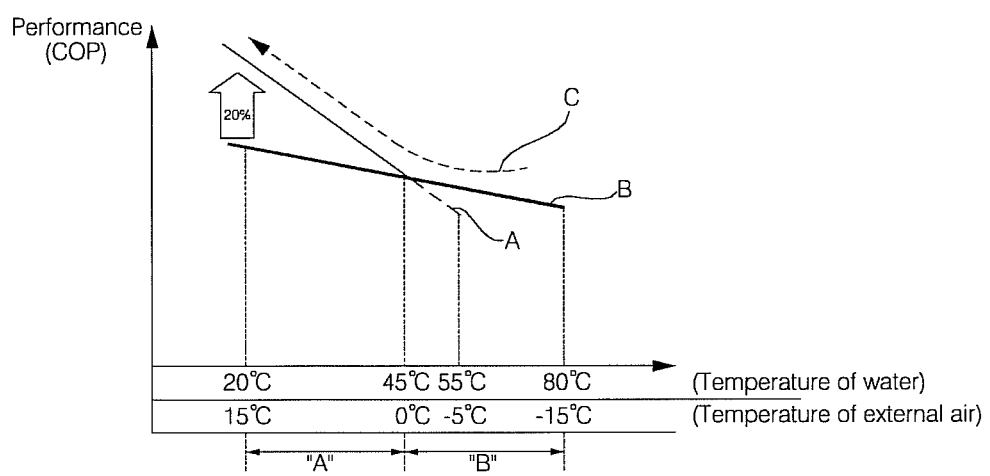
FIG. 7 is a graph illustrating performance of a heat pump interoperating hot water feeding apparatus according to an embodiment of the present invention.

FIG. 3 is a pneumatic circuit diagram illustrating a heat pump interoperating hot water feeding apparatus according to an embodiment of the present invention. FIG. 4 illustrates a flow of a coolant when the temperature of external air is high and target water temperature of used water is low during the room heating mode operation of FIG. 3. FIG. 5 illustrates a flow of a coolant when the temperature of external air is low and target water temperature of used water is high during the room heating mode operation of FIG. 3. FIG. 6 illustrates a flow of a coolant during the room cooling mode operation and defrost mode operation of FIG. 3. FIG. 7 is a graph illustrating performance of a heat pump interoperating hot water feeding apparatus according to an embodiment of the present invention.

Referring to FIG. 3, the heat pump interoperating hot water feeding apparatus includes a first coolant circulation circuit III which includes a first compressor 105 for compressing a first coolant, a first switching valve 107 for switching the first coolant compressed by the first compressor 105 to a first usage heat exchanger 110 or an outdoor heat exchanger 140, the first usage heat exchanger 110 and the outdoor heat exchanger 140 for condensing the first coolant switched by the first switching valve 107 and evaporating the first coolant expanded by the first expander 130, a cascade heat exchanger 120 for receiving the first coolant condensed by the first usage heat exchanger 110 while condensing the first coolant to perform heat exchange with the second coolant to re-condense the first coolant, and a first expander 130 for expanding the first coolant before evaporating the first coolant by the first usage heat exchanger 110 and the outdoor heat exchanger 140. The outdoor heat exchanger 140 has the same construction as the second heat exchanger described in connection with FIG. 2.

During the room heating mode operation, the first coolant circulation circuit III of the heat pump interoperating hot water feeding apparatus is switched by the first switching valve 107 so that the high-pressure and high-temperature first coolant compressed by the first compressor 105 is immediately introduced into the first usage heat exchanger 110, and during the room cooling mode operation, the first coolant circulation circuit III is switched by the first switching valve 107 so that the high-pressure, high-temperature first coolant is shortly introduced into the outdoor heat exchanger 140.

Then, during the room heating mode operation, the first usage heat exchanger 110 performs a condensation operation. Heat generated during the condensation operation of the first usage heat exchanger 110 acts as a heat source to heat water of the used water circulation circuit 150 configured to circulate the first usage heat exchanger 110.

During the room cooling mode operation, the outdoor heat exchanger 140 performs a condensation operation. Heat generated during the condensation operation of the outdoor heat exchanger 140 is exhausted to an external space. In the case that the first usage heat exchanger 110 is an air-cooled heat exchanger, the first usage heat exchanger 110 is indoor arranged to absorb heat from indoor air upon evaporation operation for room cooling. In the case that the first usage heat exchanger 110 is a water-cooled heat exchanger, the temperature of used water may be lowered for separate purpose.

The heat pump interoperating hot water feeding apparatus includes a second coolant circulation circuit IV which includes a second compressor 125 for compressing a second coolant, a second switching valve 127 for switching the second coolant compressed by the second compressor 125 to a second usage heat exchanger 160 or a cascade heat exchanger 120, the second usage heat exchanger 160 and the cascade heat exchanger 120 for condensing the second coolant switched by the second switching valve 127 and evaporating the second coolant expanded by the second expander 135, and a second expander 135 for expanding the second coolant before evaporating the second coolant by the second usage heat exchanger 160 and the cascade heat exchanger 120.

Although the second usage heat exchanger 160 has been denoted with a reference number different from the reference number of FIG. 2, the second usage heat exchanger 160 may be the same or substantially the same as the third heat exchanger 160 of FIG. 2. Accordingly, in connection with FIG. 3, reference number "160" is used to denote the second usage heat exchanger.

During the room heating mode operation, the second coolant circulation circuit IV of the heat pump interoperating hot water feeding apparatus is switched by the second switching valve 127 so that the high-pressure and high-temperature second coolant compressed by the second compressor 125 is immediately introduced into the second usage heat exchanger 160, and during the room cooling mode operation, the second coolant circulation circuit IV is switched by the second switching valve 127 so that the high-pressure, high-temperature second coolant is shortly introduced into the cascade heat exchanger 120.

Since the second coolant is compressed/evaporated at a higher temperature/higher pressure than the first coolant, the second coolant circulation circuit IV that causes the second coolant to be immediately introduced into the cascade heat exchanger 120 like the room cooling mode operation may be inappropriate for the second coolant. If the second coolant is replaced by the first coolant and the first coolant is replaced by a coolant which may be compressed/evaporated at a lower temperature/lower pressure than the first coolant, the operation of the room cooling mode operation cycle may be relatively useful.

A flow of a coolant for each operation mode of the heat pump interoperating hot water feeding apparatus will be described in further detail.

As shown in FIG. 4, in the case that the temperature of external air is within a first preset external air temperature range in which the heat pump interoperating hot water feeding apparatus does not require a large load value for room heating (refer to "A" of FIG. 7), upon entrance of a room heating mode operation signal, only the first compressor 105 is turned on so that only the first coolant circulation circuit III is activated, and the second compressor 125 is turned off so that the second coolant circulation circuit IV remains inactivated.

For example, if the temperature of external air corresponds to a load value required for room heating that is needed for room heating mode operation but not for activating the second coolant circulation circuit IV, it is not needed to operate the second compressor 125. Under this circumstance, operation of the first compressor 105 only may provide a user with the optimal room heating performance.

In the heat pump interoperating hot water feeding apparatus, the determination of the load value required for room heating does not rely on the temperature of external air. For example, the load value required for room heating may also be determined depending on a target temperature of water heated through the used water circulation circuit.

For instance, if a target water temperature required by a user is within a low temperature range (for example, a first preset water temperature—see "A" of FIG. 7), the second usage heat exchange need not be activated for discharging high-temperature used water. Accordingly, only the first coolant circulation circuit III is activated but the second coolant circulation circuit IV is not activated similar to the operation in the first preset external air temperature range as described above—as it were, a single room heating mode operation.

The single room heating mode operation compares the first compressor 105 and the second compressor 125 to each other in terms of performance when the same external air temperature and the same used water temperature apply, and activates only the coolant circulation circuit using one that exhibits higher performance, thus raising the overall operational efficiency (refer to FIG. 7).

Next, as shown in FIG. 5, in the case that the external air temperature has a large load value required for room heating in the heat pump interoperation hot water feeding apparatus, for example, in a low external air temperature range, such as a cold region (refer to "B" of FIG. 7), if a room heating mode operation signal is entered, the heat pump interoperation hot water feeding apparatus turns on the first compressor 105 and the second compressor 125 so that the first coolant circulation circuit III and the second coolant circulation circuit IV are both activated.

That is, if the external air temperature corresponds to region B where the external air temperature is less than the first preset external temperature, the heat pump interoperation hot water feeding apparatus allows a user to have a higher target water temperature in the room so that the room maintains a higher temperature. Since the second coolant circulation circuit IV is configured above, the heat pump interoperation hot water feeding apparatus operates in a so-called cascade room heating operation mode that turns on the first compressor 105 and the second compressor 125 so that the first coolant circulation circuit III and the second coolant circulation circuit IV are both activated.

Although the cascade room heating mode operation is performed by the heat pump interoperation hot water feeding apparatus in the event that the external air temperature is less than the first preset external air temperature—that is, region B, as described above, even in the case of a region in excess of the first preset water temperature, the cascade room heating mode may apply likewise.

For example, even when the external air temperature is within the first preset external air temperature range, if a user desires to have a water temperature higher than the first preset water temperature, it may be more effective to operate the heat pump interoperation hot water feeding apparatus in the above-described cascade room heating mode.

A region where the external air temperature is less than the first preset external air temperature range and higher than the first preset water temperature range, which is a condition for operating the heat pump interoperation hot water feeding apparatus in the cascade room heating mode, may be set as a region as determined by comparing the operational performance of the first compressor 105 and the second compressor 125 when the first compressor 105 and the second compressor 125 have the same external air temperature and the same water temperature, wherein in the region, higher performance is achieved when operating both the first compressor 105 and the second compressor 125 rather than when operating only the first compressor 105.

Where the entire performance of the apparatus when the first compressor 105 is turned on appears linear with respect to the external air temperature and target water temperature (that is, refer to A of FIG. 7) is compared with where the entire performance of the apparatus when the first compressor 105 and the second compressor 125 are both turned on appears linear with respect to the external air temperature and target water temperature (that is, refer to B of FIG. 7). Depending on the result of comparison, the heat pump interoperation hot water feeding apparatus may be controlled to be operated in the region that shows higher entire performance. The control of the heat pump interoperation hot water feeding apparatus is well represented as "C" in FIG. 7.

Further, as shown in FIG. 6, in the case the external air temperature requires a room cooling mode operation of the heat pump interoperation hot water feeding apparatus, for example, when room cooling is needed as in the summer season, upon entry of a room cooling mode operation signal, the heat pump interoperation hot water feeding apparatus turns on the first compressor 105 to activate the first coolant circulation circuit III alone and turns off the second compressor 125 to keep the second coolant circulation circuit IV inactivated.

The reason why the heat pump interoperation hot water feeding apparatus inactivates the second coolant circulation circuit IV as in the foregoing single-mode operation during the room cooling mode operation by turning off the second compressor 125 is because in terms of the specification of the second coolant, the second coolant is inappropriate for room cooling mode operation and the operation of the second compressor 125 may rather cause a deterioration to the overall performance.

In the heat pump interoperation hot water feeding apparatus, the used water circulation circuit 150 includes a first used water circuit 150a that is branched from an inlet portion so that used water passes through the first usage heat exchanger 110 and a second used water circuit 150b that is branched from an inlet portion so that used water passes through the second usage heat exchanger 160.

A three-way valve 170 may be provided at the inlet portion to open/close the flow of the used water or to switch the used water to the first used water circuit 150a or the second used water circuit 150b.

Opening and closing of the three-way valve 170 may be controlled to actively fit for the target water temperature of the used water as desired by a user.

For example, if the target water temperature desired by the user is within the first preset water temperature range, the three-way valve 170 opens to pass the used water through the first used water circuit 150a so that only the first used water circuit 150a is activated irrespective of whether the second compressor 125 operates or not. Under this situation, the three-way valve 170 closes the second used water circuit 150b so that the second used water circuit 150b is not activated even when the second compressor 125 operates on to activate the second coolant circulation circuit IV.

As another example, if the target water temperature desired by the user is in excess of the first preset water temperature range, that is, when the so-called cascade room heating mode works in which both the first compressor 105 and the second compressor 125 both operate on, the three-way valve 170 opens to activate the first used water circuit 150a and the second used water circuit 150b so that the used water passes through the first used water circuit 150a and the second used water circuit 150b.

However, such dualization as to control of the operation of the first compressor 105 and the second compressor 125 and the control of the operation of the three-way valve 170 is advantageous only when first used water and second used water are separated from each other so that the first used water is used for heating a floor heating unit (not shown) and the second used water is used for hot water feeding, but not profitable when the first used water and second used water are put together to be used for single used water—under the latter circumstance, a desired objective may be sufficiently achieved only by controlling the first compressor 105 and the second compressor 125.

The embodiments of the heat pump interoperation hot water feeding apparatus have been theretofore described with reference to the accompanying drawings. In sum, the heat pump interoperation hot water feeding apparatus may be operated in various operational modes depending on the external air temperature and the target water temperature desired by a user. The heat pump interoperation hot water feeding apparatus includes the first coolant circulation circuit III and the second coolant circulation circuit IV that respectively perform evaporation/condensation at different evaporation pressures or condensation pressures by the first and second coolants, and needs to be operated in such a manner that the 105 and the second compressor 125 provide higher performance. The embodiments of the present invention suggest configurations that may realize the optimal performance.

Inventors' experiment showed that the heat pump interoperation hot water feeding apparatus may enhance performance by about 20% compared to the existing hot water feeding apparatus.

However, it should be noted that the present invention are not limited to the foregoing embodiments. For example, although the embodiments have been described in which two different coolants are used, three or more coolants may also be employed.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A heat pump interoperation hot water feeding apparatus comprising:
   a first coolant circulation circuit that circulates a first coolant by a first compressor that compresses the first coolant;
   a second coolant circulation circuit that circulates a second coolant by a second compressor that compresses the second coolant;
   a used water circulation circuit that discharges used water that is heat exchanged with one of the first coolant and the second coolant; and
   a controller configured to operate the first coolant circulation circuit alone or both the first and second coolant circulation circuits depending on one of an external air temperature, a target water temperature of the used water, and indoor temperature,
   wherein the apparatus further comprising:
   a first heat exchanger arranged at the first coolant circulation circuit, wherein the first heat exchanger primarily condenses the first coolant by allowing the first coolant to be heat exchanged with the used water flowing through the used water circulation circuit during a room heating operation;
   a second heat exchanger arranged at the second coolant circulation circuit, wherein the second heat exchanger primarily condenses the second coolant by allowing the second coolant to be heat exchanged with the used water flowing through the used water circulation circuit during a room heating operation, wherein the used water circulation circuit allows the used water to be heat exchanged with the first coolant or the second coolant through the first heat exchanger or the second heat exchanger depending on the target water temperature of the used water; and
   a cascade heat exchanger, wherein the first and second coolant circulation circuits partially cross each other therein so that during a room heating operation, the first coolant is primarily condensed by the used water circulation circuit and then heat exchanged with the second coolant to be secondarily condensed and the second coolant is heat exchanged with the first coolant to be evaporated.

2. The heat pump interoperation hot water feeding apparatus of claim 1, wherein the target water temperature of the used water includes a first preset water temperature range and a second preset water temperature range, wherein assuming that the first preset water temperature range is lower than the second preset water temperature range, when the target water temperature of the used water is within the first preset water temperature range, only the first coolant circulation circuit of the first and second coolant circulation circuits is operated so that the used water is heat exchanged with only the first coolant of the first heat exchanger.

3. The heat pump interoperation hot water feeding apparatus of claim 1, wherein the target water temperature of the used water includes a first preset water temperature range and a second preset water temperature range, wherein assuming that the first preset water temperature range is lower than the second preset water temperature range, when the target water temperature of the used water is within the second preset water temperature range, only the second coolant circulation circuit of the first and second coolant circulation circuits is operated so that the used water is heat exchanged with only the second coolant of the second heat exchanger, or both the first and second coolant circulation circuits are operated so that the used water is heat exchanged with the first coolant of the first heat exchanger and is then heat exchanged with the second coolant of the second heat exchanger.

4. The heat pump interoperation hot water feeding apparatus of claim 1, wherein the target water temperature of the used water includes a first preset water temperature range and a second preset water temperature range, wherein assuming that the first preset water temperature range is higher than the second preset water temperature range, when the target water temperature of the used water is within the first preset water temperature range, only the first coolant circulation circuit of the first and second coolant circulation circuits is operated so that the used water is heat exchanged with only the first coolant of the first heat exchanger.

5. The heat pump interoperation hot water feeding apparatus of claim 1, wherein the target water temperature of the used water includes a first preset water temperature range and a second preset water temperature range, wherein assuming that the first preset water temperature range is higher than the second preset water temperature range, when the target water temperature of the used water is within the second preset water temperature range, only the second coolant circulation circuit of the first and second coolant circulation circuits is operated so that the used water is heat exchanged with only the second coolant of the second heat exchanger, or both the first and second coolant circulation circuits are operated so that the used water is heat exchanged with the first coolant of the first heat exchanger and is then heat exchanged with the second coolant of the second heat exchanger.

6. The heat pump interoperation hot water feeding apparatus of claim 5, further comprising:
   a first compressor that compresses and circulates the first coolant; and
   a second compressor that compresses and circulates the second coolant, wherein the first preset external air temperature range or the first preset water temperature range is set so that the first compressor exhibits higher operational performance when the first and second compressors are operated at the same water temperature and the same external air temperature.

7. The heat pump interoperation hot water feeding apparatus of claim 6, wherein only the first compressor is operated so that only the first coolant circulation circuit of the first and second coolant circulation circuits is operated during a room cooling operation or during a defrost operation.

8. The heat pump interoperation hot water feeding apparatus of claim 5, wherein the used water circulation circuit includes a first used water circuit configured so that the used water passes through the first heat exchanger, a second used water circuit configured so that the used water passes through the second heat exchanger, and a valve that opens and closes a flow of the used water in the first and second used water circuits.

9. The heat pump interoperation hot water feeding apparatus of claim 8, wherein during a room heating mode operation, the valve opens the first used water circuit when the first coolant circulation circuit operates on and opens only the second used water circuit and both the first and second used water circuits when the second coolant circulation circuit operates on.

* * * * *